United States Patent [19]
Sulavuori et al.

[11] Patent Number: 5,636,264
[45] Date of Patent: Jun. 3, 1997

[54] RADIO TELEPHONE SYSTEM WHICH UTILIZES AN INFRARED SIGNAL COMMUNICATION LINK

[75] Inventors: Toni Sulavuori; Mikko Terho; Jari Hämäläinen, all of Tampere, Finland

[73] Assignee: Nokia Mobile Phones Limited, Salo, Finland

[21] Appl. No.: 567,634

[22] Filed: Dec. 5, 1995

Related U.S. Application Data

[63] Continuation of Ser. No. 108,085, Aug. 17, 1993.

[30] Foreign Application Priority Data

Aug. 18, 1992 [FI] Finland ................................ 923693

[51] Int. Cl.⁶ .............................. H04Q 7/18; H04Q 7/20
[52] U.S. Cl. ........................... 379/56; 379/58; 455/38.3
[58] Field of Search ................. 379/58, 56; 455/38.3, 455/127, 343

[56] References Cited

U.S. PATENT DOCUMENTS

| | | | |
|---|---|---|---|
| 5,086,510 | 2/1992 | Guenther et al. | 455/90 |
| 5,315,645 | 5/1994 | Matheny | 379/56 |
| 5,343,319 | 8/1994 | Moore | 359/152 |
| 5,446,783 | 8/1995 | May | 379/59 |

*Primary Examiner*—Dwayne Bost
*Assistant Examiner*—Nay Maung
*Attorney, Agent, or Firm*—Perman & Green, LLP

[57] ABSTRACT

A radio telephone system comprising a transceiver unit and an external device, such as a handset, computer or telecopier, in wireless infrared signal communication with the transceiver unit. The information transmitted between the transceiver unit and the external device is transmitted as infrared digital pulses. The infrared pulses maybe transmitted in four digital time division multiplexed channels.

20 Claims, 5 Drawing Sheets

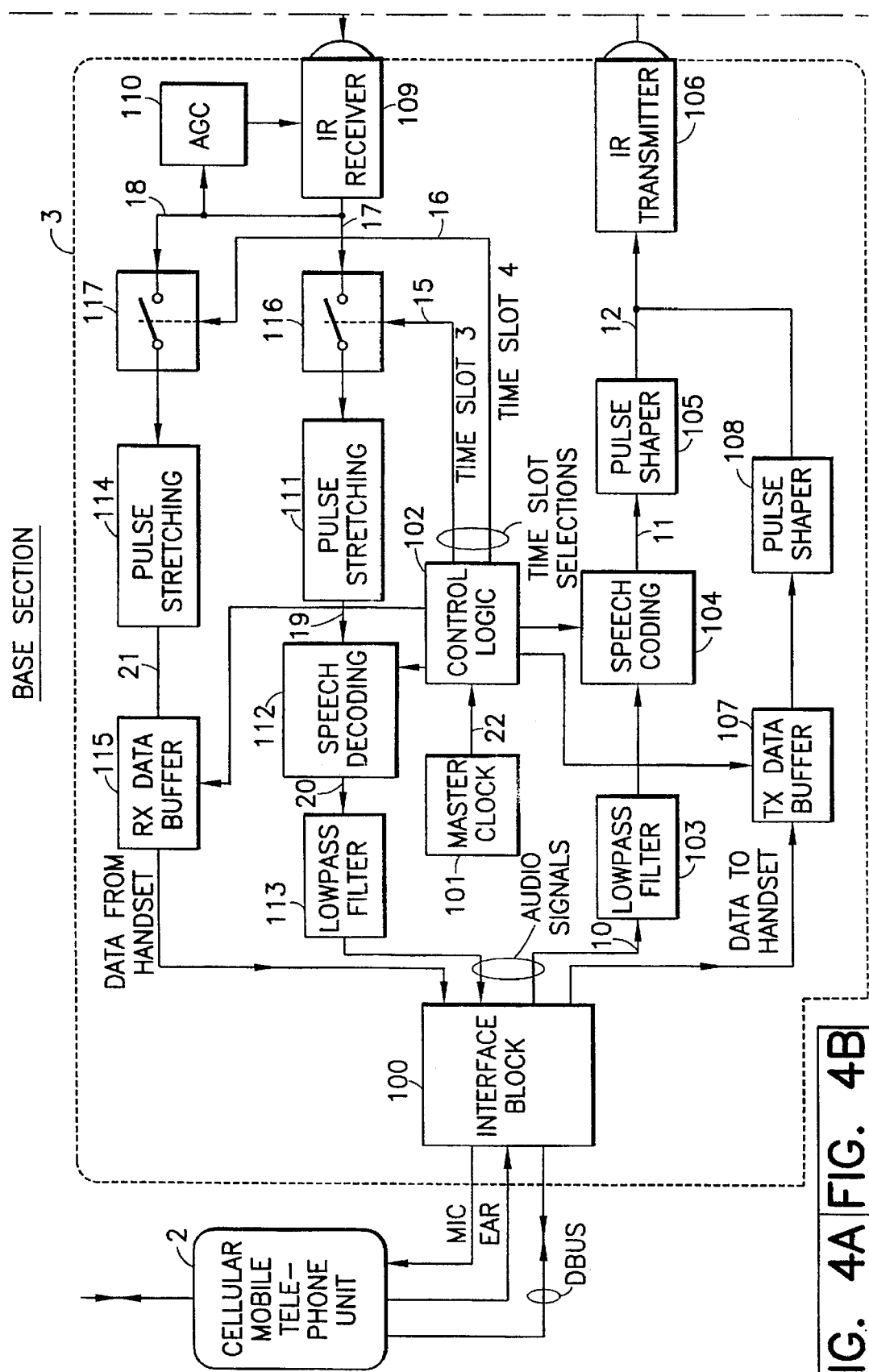

![5,636,264]

RADIO TELEPHONE SYSTEM WHICH UTILIZES AN INFRARED SIGNAL COMMUNICATION LINK

This is a continuation of copending application(s) Ser. No. 08/108,085 filed on Aug. 17, 1993.

The present invention relates to a radio telephone system comprising a transceiver unit and a device in infrared signal communication with the transceiver unit. The invention also relates to a method of transmitting information between the device and the transceiver unit.

BACKGROUND OF THE INVENTION

The user interface of a telephone, particularly in a car radio telephone, normally comprises a receiver part and an operating section (the keypad section). The receiver and the operating section may be combined or may be separate. When they are combined the operating section is often located on the rear of the receiver. The assembly comprising the receiver and the operating section is here called a handset (HS, Hand Set).

Normally the operating section is connected via a cable to a bracket having a cable connection to the subscriber unit, in a car radio telephone to the radio unit or the transceiver unit of the car radio telephone. In a car radio telephone the receiver and the operating section of the telephone are normally connected via a cable to the radio unit also when they are separately located. In a conventional telephone the operating section of the telephone is normally located in the subscriber unit. Mobile phones are becoming increasingly common, in business as well as in private use, and they are used in cars and boats. A drawback of mobile phones has been the connection of the transceiver unit to the handset via a cable, which ties the user to the site of the radio unit when the user desires to make and/or to receive calls. For instance in a car the handset is further fixed by the cord to the neighbourhood of the front seat in the car, whereby persons sitting in the car's back seat experience difficulties using the phone.

The use of the phone was made more flexible when the receiver or the whole handset was replaced by a receiver or handset based on radio frequency or infrared/ultrasonic communication. It is known to use wireless handsets in subscriber sets operating in the conventional public telephone network, whereby the communication between the handset and the subscriber set usually operates on an analog RF link. Wireless handsets usually operate on RF channels at frequencies below 50 MHz and with a power below 100 mW. Different handsets all operate approximately at the same frequencies, and therefore interference between handsets will occur. These wireless handsets further receive interference from television, police and other radios operating at the same frequencies. U.S. Pat. No. 4,745,632 presents a wireless mobile phone system, which combines a conventional mobile phone and a conventional subscriber set comprising a wireless handset. Certainly this is a solution requiring much space, when there are two pairs of interconnected handsets and subscriber sets. U.S. Pat. No. 4,659,878 presents a mobile phone comprising a wireless handset, in which the connection between the handset and the radio unit is an RF connection without interference. One disadvantage of an RF connection is certainly that at present a car contains a large number of different electronic devices, and thus much electromagnetic radiation or radio pollution is created. Further, if the car contains a large number of devices using RF connections they easily cause mutual interference.

European Patent Application, EP-A-3 165 058 A presents a telephone having a receiver in wireless analog infrared communication with the subscriber set. A wireless connection as a secondary embodiment between the handset and the transceiver is shown in U.S. Pat. No. 4,219,411. Here the primary connection is a cable connection, and if the connection is wireless, then the operation has to be controlled by a direction switch. The connection is primarily operated by the cable, even if the patent mentions the wireless as one possibility. The wireless connection in the first place is conceived for the control operations of the telephone, and not for speech transmission. This is mainly due to the fact that difficulties occur when attempting speech transmission over an infrared connection.

There has been a problem in providing sufficient infrared power in the car cabin so that the wireless device would operate regardless of its location in the car. A limiting factor in achieving a sufficient infrared power is the maximum continuously emitted power which the infrared LEDs can provide. In analog infrared connections the continuous power demand is often so high that the operating time will be short for a handset operating with a battery. EPO Finnish patent No. FI-82334 (corresponding European patent application EP 0 383 277) presents a system having a separate wireless receiver and a separate wireless operating section. In this system the operating section is unidirectional, i.e., because it has no receiver it can only issue control commands.

SUMMARY OF THE INVENTION

According to a first aspect of the present invention there is provided a radio telephone system comprising a transceiver unit and an external device in infrared signal communication with the transceiver unit via an infrared link, characterized in that the infrared signals to be transmitted between the transceiver unit and the external device are transmitted in digital pulsed form.

According to a second aspect of the present invention there is provided a method of transmitting information between an external device and a transceiver unit as an infrared signal, characterized in that the signal is transmitted in a digital pulsed form.

An advantage of the present invention is the provision of a radio telephone system with which it is possible to realize a reliable communication between a radio transceiver and an external device, while maintaining a very low power consumption.

Another advantage of the present invention is the provision of a radio telephone system and a method of operation, with which it is possible to realize a reliable two-directional radio telephone connection, with which speech and data can be transmitted in two directions, keeping the power consumption low.

Such an arrangement and method can be realized using infrared communication between the external device, such as the radio telephone handset, and the radio unit, the communication being digital and comprising four time division multiplexed digital channels, a speech and a data channel in each direction.

Alternatively, only speech or data channels can be arranged. The channels carry digitized speech and data in digital form so that in the direction from the external device (the handset) to the radio unit one of the channels transmits digitized speech and the second transmits data, e.g., keypad information. In the opposite direction one of the channels transmits digitized speech and the other data, e.g., display information. The data channels can also transmit other data than keypad and display information.

When speech and data are digital it is possible to transmit them as short infrared pulses, whereby the infrared emitter, preferably an IR-LED, can momentarily output an emitted power which is tens of times higher without increasing the average power consumption; in other words the power consumption of the IR transmitter can be reduced to a fraction, however without impairing the signal to noise ratio. The smaller the duty cycle is or the narrower the IR pulse is, and the less frequently it is transmitted, the higher the momentarily emitted power can be. The average power consumption can also be reduced when the IR pulses are transmitted less frequently.

The infrared connection between the radio unit and the external device, such as a handset, can be realized as a wireless connection or by the use of an optical cable. The information must be in digital form so that it can be transmitted as IR pulses, and thus the speech must be digitally encoded. When the speech is digitally encoded the obtained bit stream can be transmitted on the infrared transmission path using binary amplitude modulation (ASK, Amplitude Shift Keying), in which the relative amplitude of the transmitted carrier is one for a transmitted '1'-bit, and zero for a transmitted '0'-bit. The emitting frequency of the IR-LED can be used as the modulating carrier, whereby only the '1'-bits cause infrared emission when the bit stream is transmitted. These '1'-bits B can be transmitted as short IR pulses P, shown in FIG. 1, whereby we can utilize the high pulse effects mentioned above. The receiver simply has to detect whether an IR pulse was sent or not.

In a radio telephone operating with a handset it has to be possible to transmit speech simultaneously in two directions. Further each direction must have a data channel of its own, in which keypad information is transmitted on one channel and display information is transmitted on the other channel from the radio unit to the handset. The data transmission capacity of the data channels is not necessarily very high, because transmission of keypad information and updating of display information is possible also with a relatively slow data transmission rate (<100 bit/s). Thus there are four digital channels to be transmitted (two speech and two data channels). Because the transmission of a short infrared pulse occupies a broad frequency band, it is useful to transmit the channel bits alternating on the infrared transmission path, whereby each channel can utilize the whole frequency band in turn, i.e., time division multiplexing (TDM) is used as the multiplexing method.

The channels could of course be in any other order. Preferably the information is transmitted on time division multiplexed channels, because they do not cause mutual interference. It is also possible to transmit the information in some other digital form than time division multiplex.

Instead of improving the S/N ratio it is possible by the above measures to decrease the power consumption of the trasmitter, without impairing the received S/N ratio. Halving the bit rate also enables the halving of the current supplied to the transmitter component, preferably an IR-LED, also e.g., a laser diode, which is the component in the transmitter requiring the highest current. On the other hand, halving the pulse length makes it possible to decrease the size of the said current component to be $1\sqrt{2}$ of the previous value. The current required by the transmitter component can be decreased in total to a fraction of $1/(2*\sqrt{2}) \approx ½,8$ of the previous value.

When we calculated the pulse rates above, we assumed that only '1'-bits were to be transmitted, i.e., that an infrared pulse is transmitted in each time slot of the channel. In practice the digitally encoded speech also contains plenty of '0'-bits, during which no IR pulses are transmitted. Thus the effective pulse ratio will be lower than mentioned above, which enables the use of somewhat higher pulse currents.

In the method and the arrangement in accordance with the invention it is possible to use different methods to encode the speech into a bit stream, such as the pulse code modulation (PCM) adaptive differential pulse code modulation (ADPCM), or the continously variable slope delta modulation (CVSD), or any other suitable modulation method, preferably however, the CVSD-method is used.

The PCM encoder encodes the speech into a bit stream having the rate 64 kbit/s. Normal speech contains plenty of pauses, during which the PCM encoded signal contains only '0'-bits. When this encoding method is used it is advisable to invert the bit stream transmitted by the base section BASE prior to infrared transmission to the external device (handset HS), whereby an IR pulse is caused by each '0'-bit and not by the '1'-bits. Then it is guaranteed that the external device can receive sufficiently many IR pulses from the base section BASE in order to maintain the synchronization of the recovered clock. On the other hand it is not advisable to invert the PCM code transmitted by the external device, because then the external device is not required to transmit IR pulses during pauses in the speech and thus power is saved. PCM encoding is used in the public telephone network, and generally the PCM encoding circuits contain the required filtering structures as well as the encoding and decoding functions, the origin of their name 'codec circuits'.

The encoding of the bit stream generated by the PCM encoder at 64 kbit/s into a slower bit stream comes off with an ADPCM circuit (Adaptive Differential Pulse Code Modulation), which decreases the bit stream rate to 32, 24 or 16 kbit/s. The price of ADPCM circuits designed to cooperate with a separate PCM codec is of the same magnitude as the codec itself, so that we get a rather high increase of the component costs when we use this encoding method. CT2 (Cordless Telecommunications, second generation) and DECT (Digital European Cordless Telecommunications) are standards for the digital wireless telephone, both using ADPCM encoding at a rate of 32 kbit/s to encode the speech. Microcircuits have been developed for the use in the equipment of these systems, the circuits comprising an ADPCM codec and further microphone and earphone amplifiers including the required filters. These circuits are rather expensive, at least at present, because they are versatile and still quite new. A lower bit stream rate causing a more infrequent transmission of the IR pulses provides a lower power consumption and transmission of pulses at a higher power level.

An inexpensive and simple way to encode the speech into digital form is to use a CVSD modulator or a Continuously Variable Slope Delta Modulator. The bit rate in the CVSD system is directly determined by the modulator clock frequency, which can be freely selected within the range 10 to 64 kHz. The higher the clock frequency, the higher quality speech is transmitted. The speech quality of the PCM system normally used in the public telephone network is achieved in the CVSD system already at a bit rate of 32 kbit/s (at least according to circuit manufacturers). However, while very advanced speech compression methods are available providing lower bit rates, CVSD is an excellent compromise between bit rate and the complexity of the realization. During pauses in the speech a sequence '. . . 101010 . . .' is transmitted in the CVSD system, which means that pulses arrive at a frequency, which is half of the clock frequency used in the CVSD modultor. Then no sounds are heard in the telephone, but the external device clock maintains its synchronization. The transmission of the '. . . 101010 . . .' sequence is interrupted when a speech signal is again received from the radio unit. Because the system inherently seeks to remove long strings of '1''s and '0''s (in order to decrease the slope distortion), the CVSD system will have no situations where the recovered external device clock would drift out of synchronization.

In PCM the significance of the most significant bit in the 8-bit code is clearly higher than that of the least significant bit, while in the CVSD code each bit has about the same significance. Therefore speech interference caused by bit errors in the transmission are not as annoying as in the case of PCM. Due to the above mentioned features it is preferred to use the CVSD method as the speech encoding method in the method and arrangement according to the invention.

BRIEF DESCRIPTION OF THE DRAWINGS

Embodiments of the present invention are described herewith, by way of example, with reference to the accompanying drawings in which.

DETAILED DESCRIPTION OF THE INVENTION

Figure 1:
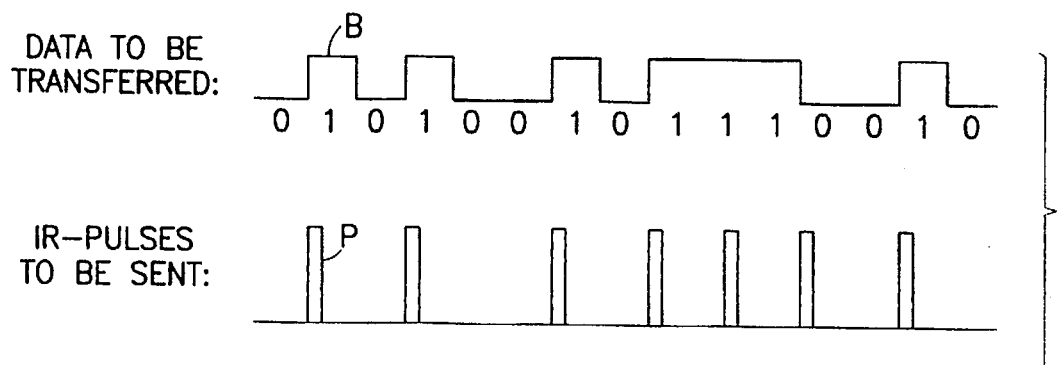
FIG. 1 shows binary amplitude modulation of an infrared signal.
Figure 2:
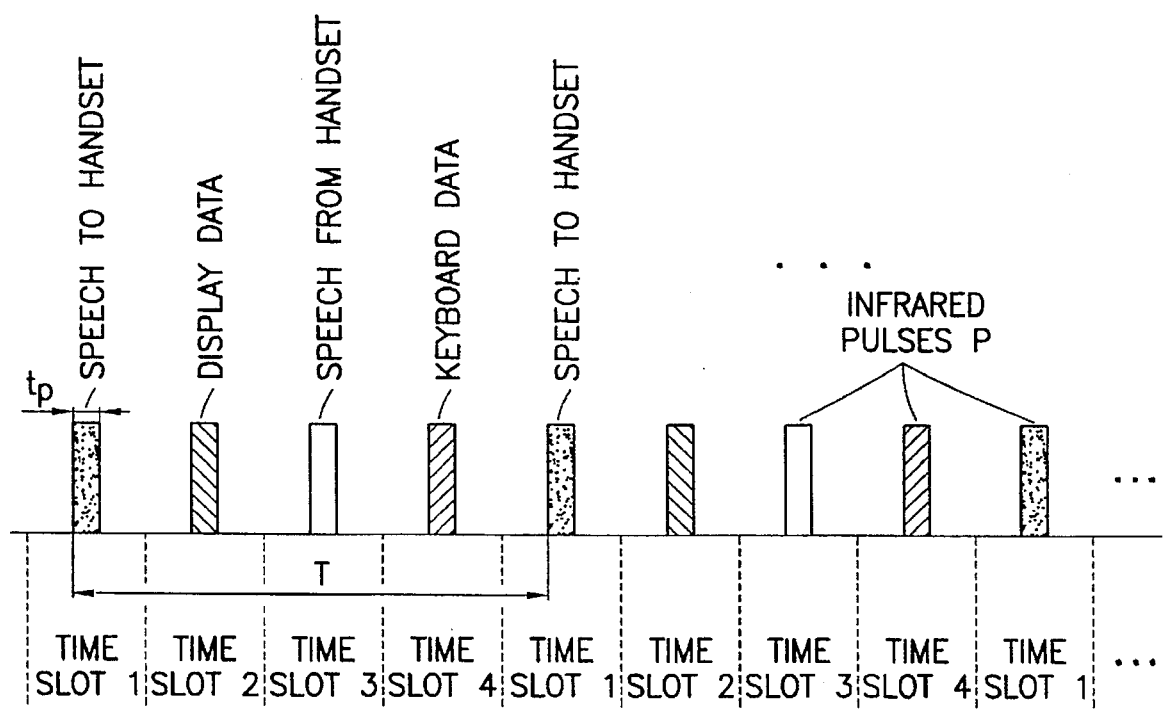
FIG. 2 shows the time division multiplexing of the channels.

Above reference was made to FIGS. 1 and 2 in connection with speech encoding and transmission. The invention is described below with reference to FIG. 3, which shows the main parts of the system: the radio unit 2 or the transceiver 2 operating at radio frequency, an infrared transceiver 3 which here is a so called base section connected by a line to the transeiver unit, and a handset 4 representing the external device and operating on the infrared connection and communicating with the base section 3; and with reference to the FIG. 4, which shows the embodiments of the handset and the infrared transceiver 3 as block diagrams, as well as the connection to the telephone section 2. The invention is not limited to the embodiment shown in FIG. 4, but FIG. 4 is an alternative for the realization of the invention in accordance with the claims.

The multiplexing could be realized e.g., according to FIG. 2, whereby the first time slot transmits speech received by the radio telephone via the radio unit base section 3 to the external device, e.g., the handset 4. The second time slot transmits to the handset display information shown in its display. The third time slot transmits speech from the handset 4 to the radio unit base section 3, and the fourth time slot transmits keypad information supplied by the user to the radio telephone 2 via the base section 3.

If the speech is encoded into a 64 kbit/s bit stream (e.g., standard PCM coding), one bit period T=1/64000s=about 16 µs (FIG. 2). This period must be shared by the four channels to be transmitted, or each channel can have a period of about 4 µs, in which any IR pulse corresponding to the '1'-bit must be transmitted. When time division multiplexing is used, the system clocks of the external device (handset 4) and the IR transceiver unit 4 in the radio unit 2 must be mutually synchronized so that both will know at which moment each channel is to be transmitted. The clock of the base section 3 can be used as the master clock. The base section 3 transmits its IR pulses in synchronism with its clock, so that the receiver unit of the external device 4 can recover the clock from the pulse sequence which it receives. In practice the data channels will transmit information very infrequently, and thus the clock must be recovered from the speech bit stream. IR pulses must be received sufficiently often so that the recovered clock will maintain its synchronism. The radio unit and the external device both will have a microprocessor controlling their functions, so that information transmission and reception occur at predetermined moments according to the clocks.

Let us assume that the bit rate is 64 kbit/s, whereby T=15.625 µs. When an inexpensive GaAs LED having a rise time slightly less than 1 µs is used as the infrared transmitter component, then the IR pulse length tp (FIG. 2) could be about 2 µs at its minimum. Then we obtain the IR signal pulse ratio: tp/T=0.128. With the mentioned pulse length and pulse ratio we can use, e.g., 550 mA pulse currents to control the IR-LED, depending however on the IR-LED to be used. Then we assumed that the data channel bit rate transmitted in the same direction, and using the same IR LEDs, is so low compared to the speech channel bit rate that it has a negligible influence on the avarage drive current of the IR-LED.

If we can encode the speech so that the bit rate is only 32 kbit/s we can halve the pulse ratio of the infrared signal (tp/T=0.064), whereby the drive current of the IR-LED can be increased from 550 mA to about 1 A, that is by a factor of about 1.82. The momentary emission power of the infrared signal also increases in the same proportion. The emission received by the active surface of the PIN diode operating as the receiving component also increases in the same proportion, so that also the signal current provided by the PIN diode increases by a factor of 1.82. The received signal to noise ratio S/N increases thus by $20 \log 1.82$ dB≈5.2 dB. Thus the bit rate of the digital signal resulting from the speech encoding has a critical effect on improving the signal to noise ratio S/N without increasing the power consumption of the handset.

If a faster IR-LED is available we can shorten the pulse length from two microseconds to, e.g., one microsecond. Then the pulse ratio is again halved, enabling an increase of the pulse current. When the pulse length tp is shortened to one microsecond we obtain the pulse ratio tp/T=0.032. Now we can use current pulses of, e.g., 1.8 A to drive the IR-LED. The bandwidth of the receiver must be doubled in order to receive the pulse shortened to one half. The doubled noise bandwidth corresponds to an increase in the noise current by the factor $\sqrt{2}$. The received signal to noise ratio is then improved by $20 \log (1.8 \text{ A}/1 \text{ A}\sqrt{2})$dB≈2.1 dB. The effect of halving the bit rate and the IR pulse length tp leads to an improvement of the received signal to noise ratio S/N by about, 7.3 dB, without increasing the transmitter power consumption.

Figure 3:
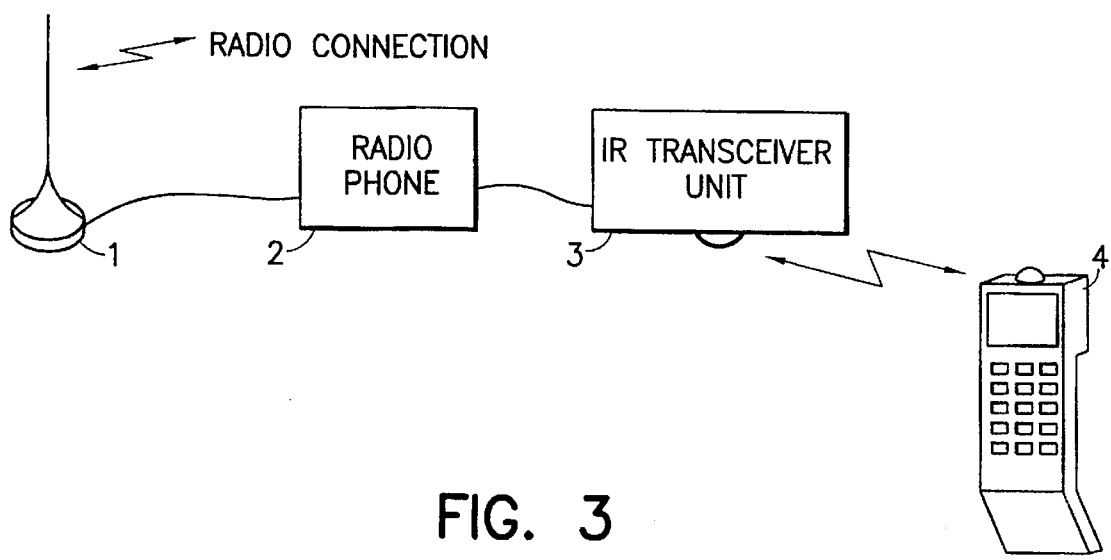
FIG. 3 shows a telephone system in accordance with the invention.
Figure 4B:
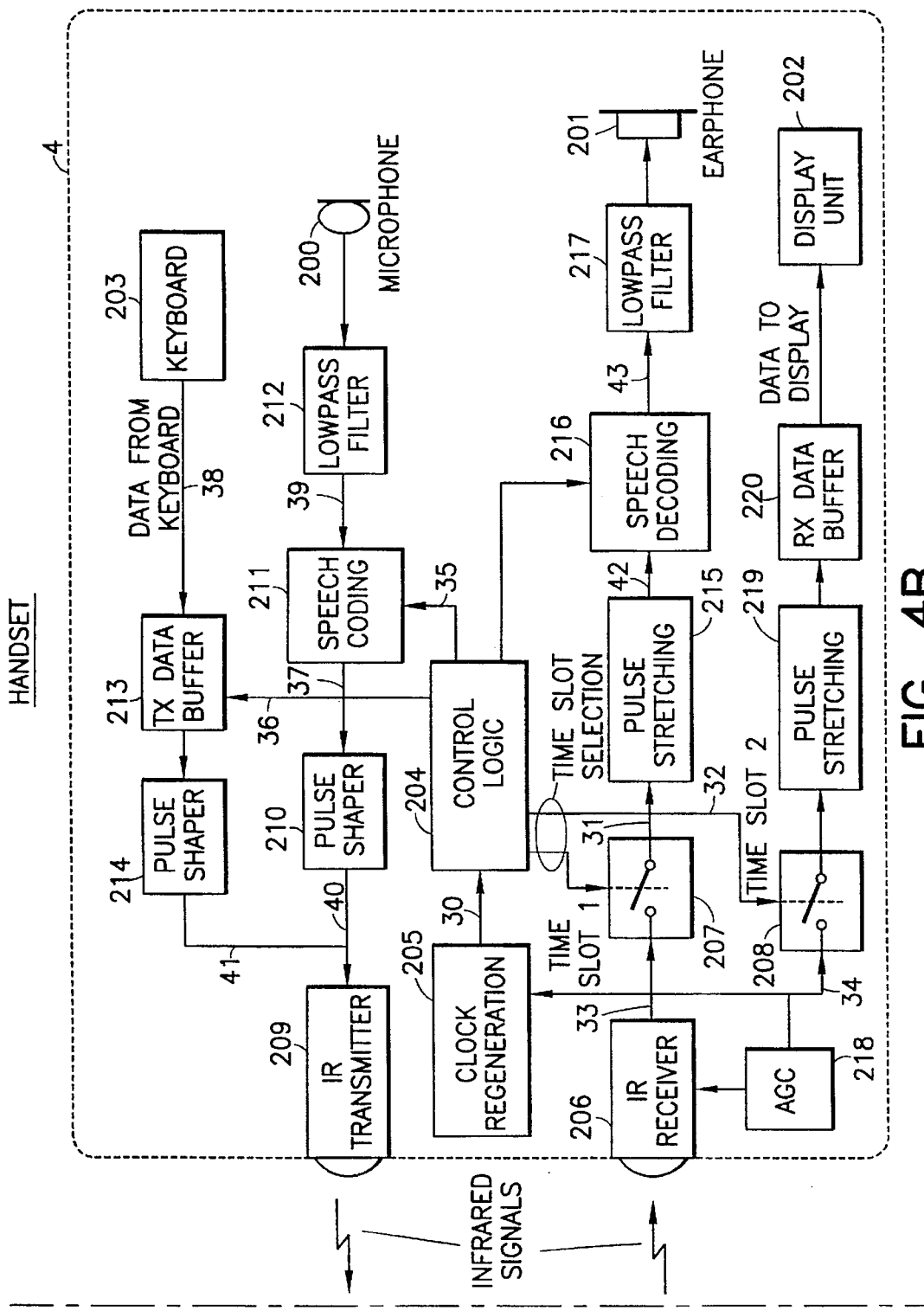
FIG. 4 shows a basic block diagram of a telephone system in accordance with the invention.

The infrared communication device comprises an external device section (which in FIG. 3 is shown as a handset section 4) and the base section 3, which is connected to the radio telephone or radio unit 2 comprising an RF transceiver, duplex data and/or digitally encoded speech being transmitted as pulse-like infrared signals between the handset and the base section BASE. These four (or two, if only speech or data is transmitted) digital channels can be time division multiplexed on the infrared transmission path according to FIG. 2. Due to the time division the clocks of the external device and the base section BASE are mutually synchronized.

One possible realization of the radio telephone system is shown in FIG. 4 as a block diagram, in which for an example the external device is represented by a handset 4. The radio unit 2 is connected to the base section interface block 100 through the microphone line MIC, the earphone line EAR and the internal data transmission bus DBUS. The speech signal received by the base section BASE from the handset HS is supplied to the microphone line in a corresponding way as in the case of an external device connected to the telephone 2 by an electrical cord, whereby the signal is amplified in the telephone and transmitted via the antenna 1. Correspondingly the signal received by the telephone antenna is supplied to the earphone line EAR, whereby the speech signal received via the earphone line EAR is directed to the transmit branch of the base section 3 in order to be transmitted to the handset 4. The interface of the data flow to and from the handset HS to the telephone's data bus DBUS is also made in the interface block 100.

The master clock block 101 contains a clock oscillator locked to a crystal. The clock signal 22 obtained as output is supplied to the control logic block 102, which controls the transmit and receive as well as the data transmission functions.

The speech signal 10 received on the earphone line EAR by the interface block 100 and to be transmitted to the handset 4 is low-pass filtered in the low-pass filter 103, after which it is encoded into digital form in the speech encoding block 104 using a speech encoding method, preferably the CVSD method. In the pulse shaper block 105 the digitized speech signal 11 is transformed into a pulse sequence containing short pulses 12, whereby the individual pulses are further transmitted by the infrared transmitter block 106 to the handset HS in a time slot reserved for this speech channel (time slot 1, FIG. 2).

Data 13 (display data) received from the telephone's data transmission bus DBUS and intended to be transmitted to the handset 4 is stored into the TX data buffer block 107. The data is timed by the control logic 102 and transmitted further to the pulse shaper block 108, whereby the individual pulses in the pulse sequence generated from the data 14 are transmitted to the handset 4 by the infrared transmitter 106 in the time slot reserved for this data channel time slot 2, FIG. 2).

The infrared receiver block 109 of the base section BASE receives the infrared pulses transmitted by the handset 4. The control logic 102 outputs time slot selection signals 15, 16, which at the correct moment open the signal path for a speech channel pulse 17 (time slot 3, FIG. 2), and the data channel for the pulse 18 (time slot 4, FIG. 2) to be received. The automatic gain control block 110 (block AGC) controls the gain of the infrared receiver 109 in accordance with the signal strength.

The pulse stretching block 111 transforms the pulses received in the speech channel time slot into a binary digital signal 19, which is supplied to the speech decoding block 112. The analog speech signal 20 obtained from the speech decoding block 112 is low-pass filtered by the low-pass filter 113, after which it is supplied via the interface block 100 to the telephone's microphone line MIC.

The pulse stretching block 114 transforms the pulses received in the data channel time slot into a binary digital signal 21, which is transmitted to the RX data buffer block 115 and via the interface block 100 to the telephone's data transmission bus DBUS.

The structure of the handset 4 is to a great extent similar to that of the base section 3. The difference from the base section is the absence of the interface block 100 and the recovery of the clock signal. Instead of the earphone and microphone lines the handset has a microphone 200 and an earphone 201, and instead of the data transmission bus a display unit 202 and a keypad 203. The control logic block 204, which controls the receiving and transmitting functions as well as the data transmission functions in the handset HS, receives from the clock recovery block 205 a clock signal 30, which is synchronized to the pulse sequence received by the infrared receiver 206, which in turn is synchronized to the master clock 101 of the base section. When the clock signals 22, 30 of the base section and the handset are thus mutually synchronized, the handset's control logic block 204 is able to open, by the switches 207, 208 controlled by the time slot signals 31, 32, 35, 36, the signal paths for the received speech channel pulses 33 (time slot 1), and for the data channel pulse 34 (time slot 2), and to direct the transmitted pulses of the speech channel 37 (time slot 3) and data channel 38 (time slot 4) in the correct time slots to the infrared transmitter 209. The other blocks 210–214 of the handset's 4 transmitter section perform the corresponding functions as the transmitter section blocks 103–108 of the base section BASE, and the other blocks 215–220 of the receiver section in the handset HS perform the corresponding functions as the receiver section blocks of the base section BASE.

Figure 5:
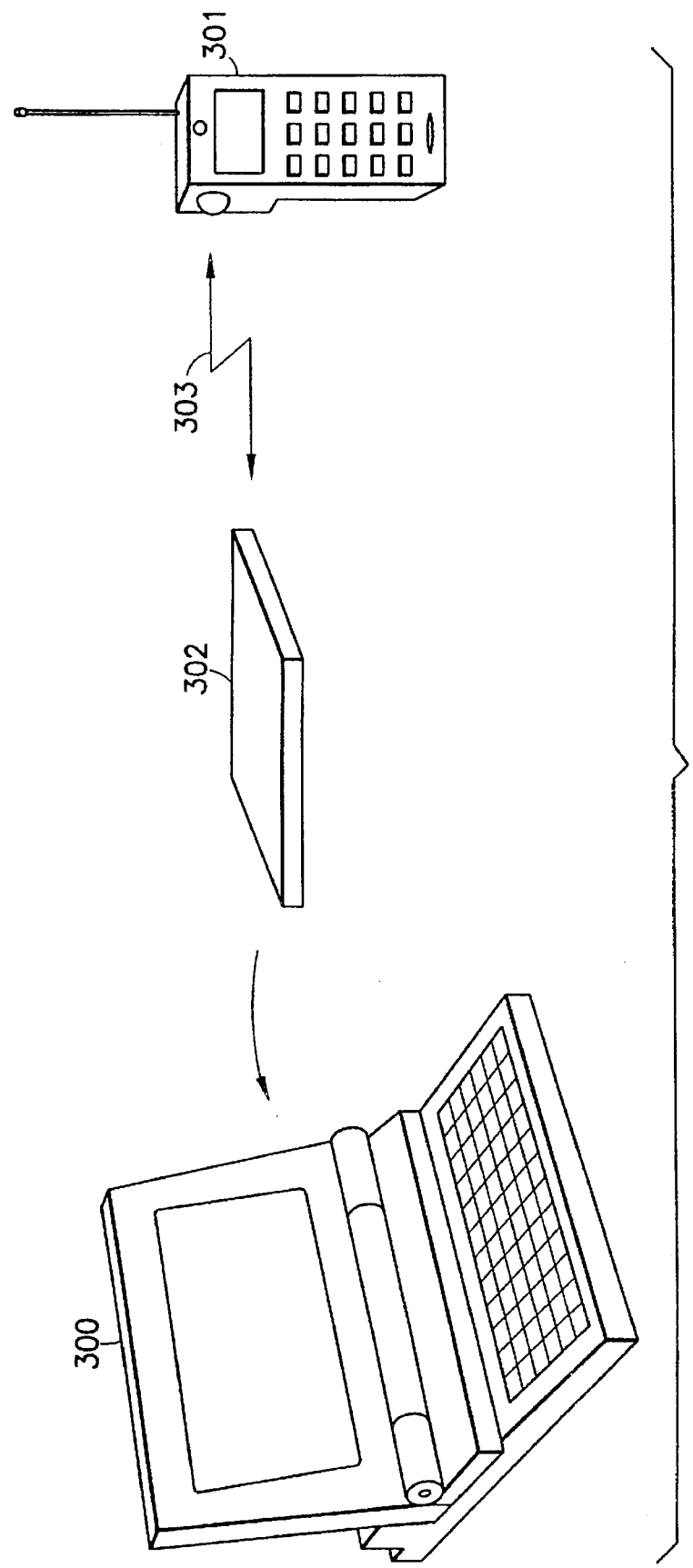
FIG. 5 shows another telephone system in accordance with the invention.

The above presented examples concern the implementation of an infrared link according to the invention between a radio transceiver and a handset. Besides a handset, the external device can be any device, which can be connected to a radio telephone, e.g., a computer or a telecopier. It is already prior known to transfer data from and computer or telecopier by connection to a radio telephone. For such a connection the computer or telecopier 300 is provided, e.g., with a PCMCIA data card 302 (Personal Computer Memory Card International Association), which may include a modem (for data and telecopier) and which can either be built in the computer or telecopier or the computer or telecopier may have a PCMCIA slot, into which the PCMCIA data card 302 is pushed when one wishes to use the computer or telecopier 300 with a phone as illustrated in FIG. 5.

For using a computer or telecopier 300 (shown as a computer) as the external device in the arrangement according to the invention (shown in FIG. 5), the infrared connection 303 between the radio unit 301 and the computer/telecopier 300 would be between the radio phone 301 and the PCMCIA data card 302, which thereby communicates with the radio phone 301 through the infrared connection 303. The necessary device implementation (as shown in FIG. 4) can in this case be implemented in the computer, preferably in the PCMCIA card, whereby the implementation can be similar to the one shown for the base section in FIG. 4. Data from a computer or telecopier is converted in correct form for the radio telephone in the PCMCIA data card and this converted data can be transmitted by the radio telephone without any conversion when the radio telephone system is digital. The interface between the PCMCIA data card and the computer can be similar to a prior known interface. The infrared connection 303 (which may be wireless or optical cable) in this embodiment only replaces an electrical wire connection between the PCMCIA data card 302 and the radio telephone 301.

Another possible realization of a computer or telecopier connected to a radio telephone by an infrared connection according to the invention is to have a built-in- modem in the radio telephone, whereby there is no need for modem functions in the PCMCIA data card. The modem converts received data (received by the radio telephone as a rf-signal) to transportable form and the data is converted into asynchronous serial format, e.g., in a UART unit (Universal Asynchronous Receiver Transmitter), which forwards the data to an infrared transmitter transmitting the data to the computer in asynchronous serial form (to the PCMCIA unit, from which the connection to the computer is parallel). When the computer sends data through the radio telephone the previous steps are performed in reverse order. This kind of realization can well be used in both analog and digital radio communication systems.

In an analog radio communication system the necessary signals are transmitted from the radio telephone as infrared pulses to the PCMCIA data card, which converts these signals to appropriate form for the computer. The signals can be as shown in FIG. 4, MIC (sent data/speech), EAR (received data/speech) and data bus DBUS signals. When the computer sends data through the radio telephone, the data is converted to MIC, EAR and data bus signals in the PCMCIA data card and transmitted to the radio telephone via the infrared link. The necessary conversions are made in the radio telephone as explained here previously before sending the data through the radio frequency connection.

The arrangement comprises a reliable radio telephone communication link to an external device operating on a two-directional infrared connection, by which it is possible to transmit both speech and data in both directions, or alternatively only speech or data, having a low average power consumption. Because the external device operates on an infrared connection no radio pollution is generated when a handset according to the invention is used in a car. Moreover, the infrared signal does not spread outside the car, and regarding call protection the arrangement according to the invention is safer than a handset operating on an RF connection. Besides implementing a wireless infrared connection, also an optical cable can be used.

In view of the foregoing it will be clear to a person skilled in the art that modifications may be incorporated without departing from the scope of the present invention.

What we claim is:

1. A radio telephone system comprising a transceiver unit and an external device in infrared signal communication with the transceiver unit via an infrared link, wherein:
    the transceiver unit comprises:
        a first transceiver means for bi-directionally communicating signals representing at least one of speech and data, and RF transceiver means for bi-directionally communicating with at least one RF channel and bi-directionally coupling electrical signals representing said at least one of speech and data between said RF channel and said first transceiver means;
    the external device comprises:
        a second transceiver means for bi-directionally communicating signals representing said at least one of speech and data;
    and said system further comprising:
        system clock means for producing a timing signal having regular time slots for timing the communication of said bi-directionally communicating signals;
        means for bi-directionally communicating infrared signals in digital pulsed form, having at least one of a reduced bit rate and a reduced pulse width with respect to said regular time slots to lower average power consumption, over said infrared link between said transceiver unit and said external device, comprising:
            optical transceiver means, optically coupled over said infrared link to one of said first and second transceiver means, for bi-directionally convering infrared signals in digital pulsed form to and from electrical signals representing one of speech and data, and coupling said electrical signals representing one of speech and data bi-directionally to the one of said first and second transceivers not optically coupled to said optical transceiver means.

2. A system as claimed in claim 1, wherein said optical transceiver means optically couples the infrared signals over said infrared link as wireless infrared signals.

3. A system as claimed in claim 1, wherein said optical transceiver means optically couples the infrared signals over said infrared link through an optical cable.

4. A system as claimed in claim 1, wherein said optical transceiver means is separate from and connected to the one of said first and second transceivers not coupled optically to said optical transceiver means via a cable.

5. A system as claimed in claim 1, wherein said infrared and electrical signals comprise signals representing both speech and data and the infrared signals are transmitted over the infrared link in four digital time division multiplexed channels, including one speech channel and one data channel in both directions.

6. A system as claimed in claim 5, further comprising:
    means for controlling the external device and the transceiver unit to transmit and receive signals representing speech and data at a correct moment in the time division multiplexed digital channels to produce synchronism with said regular time slots, whereby speech and data signals are sent bi-directionally in a multiplexed manner by said optical transceiver means.

7. A system as claimed in claim 1, wherein the external device and the transceiver unit have means for encoding signals representing speech into digital form, said encoding means comprising a continuously variable delta (CVSD) modulator.

8. A method of transmitting information bi-directionally between an external device and a transceiver unit by means of an infrared signal over an infrared link, comprising the steps of:
    producing electrical signals indicative of said information using an RF transceiver in said transceiver unit that bi-directionally communicates with at least one RF channel carrying said information;
    producing a clocking signal having regular time slots for timing said bi-directional communication;
    bi-directionally communicating infrared signals indicative of said information in digital pulsed form over said infrared link to and from said transceiver unit, by converting electrical signals to infrared digital signals having at least one of a reduced bit rate and a reduced pulse width with respect to the clocking signal time slots to lower average power consumption, and converting said infrared digital signals back to electrical signals, indicative of said information respectively from and to said RF transceiver using a first optical transceiver bi-directionally coupled to said RF transceiver in said transceiver unit;
    bi-directionally communicating said infrared digital signals indicative of said information over said infrared link by coupling said first optical transceiver with a second optical transceiver disposed externally of said transceiver unit, and using said second optical transceiver to convert said infrared digital signals back to electrical signals, and electrical signals to said infrared digital signals, indicative of said information respectively from and to said first optical transceiver; and bi-directionally coupling said second optical transceiver electrically to said external device.

9. A method as claimed in claim 8, wherein the infrared digital signals are transmitted over said infrared link as a wireless infrared signal.

10. A method as claimed in claim 8, wherein the infrared digital signals are transmitted over said infrared link through an optical cable.

11. A method as claimed in claim 8, wherein said information comprises at least one of speech and data.

12. A method as claimed in claim 8, wherein the infrared digital signals are transmitted over the infrared link in four time division multiplexed channels, including one speech channel and one data channel in both directions.

13. A method as claimed in claim 8, wherein the first optical transceiver and the second optical transceiver are provided with continuously variable delta (CVDS) modulators for encoding said electrical signals into digital form.

14. A communications system, comprising:

a first device having a first transceiver means for bi-directionally communicating signals representing information;

a second device comprising a second transceiver means for bi-directionally communicating signals representing said information, and an RF transceiver means for bi-directionally communicating signals representing said information between at least one RF channel and said second transceiver means;

system clock means for producing a timing signal having regular time slots for timing the communication of said bi-directionally communicating signals; and optical transceiver means, capable of producing bi-directional digital infrared (IR) pulse signals, having at least one of a reduced bit rate and a reduced pulse width with respect to said regular time slots to lower average power consumption, in response to and indicative of said signals representing said information, for optically coupling said first device and said second device through pulsed IR communication with one of said first and second transceivers, to digitally communicate said signals representing said information, bi-directionally with lower average power consumption between said first and second devices.

15. A system as in claim 14 wherein said first device comprises at least one of a telephone handset, a computer, and a telecopier.

16. A system as in claim 14 wherein said second device comprises a cellular phone.

17. A system as in claim 14 wherein said optical transceiver means comprises a PCMCIA card.

18. A system as in claim 14 wherein said optical transceiver means is disposed in one of said first and second devices.

19. A system as in claim 14 wherein said optical transceiver means further comprises first electrical connector means for bi-directionally communicating electrical signals representing said information, and the other of said one of said first and second transceivers comprises second electrical connector means for bi-directionally communicating electrical signals representing said information with said first electrical connector means.

20. A system as in claim 14 wherein said information comprises speech and data and said optical transceiver means and said one of said first and second transceivers are coupled by bi-directional digital infrared (IR) pulse signals in four time division multiplexed communication channels comprising one channel for conducting electrical signals representing speech, and one channel for conducting electrical signals representing data, in both directions.

* * * * *